(12) United States Patent
Yoon

(10) Patent No.: US 9,987,915 B1
(45) Date of Patent: Jun. 5, 2018

(54) ENGINE MOUNT FOR VEHICLE

(71) Applicants: Hyundai Motor Company, Seoul (KR); Kia Motors Corporation, Seoul (KR)

(72) Inventor: Hyoung Jin Yoon, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days. days.

(21) Appl. No.: 15/684,636

(22) Filed: Aug. 23, 2017

(30) Foreign Application Priority Data

Dec. 6, 2016 (KR) .................. 10-2016-0164919

(51) Int. Cl.
*B60K 5/12* (2006.01)

(52) U.S. Cl.
CPC .......... *B60K 5/1208* (2013.01); *B60K 5/1291* (2013.01)

(58) Field of Classification Search
CPC .. B60K 5/1275; B60K 5/1283; B60K 5/1291; B60K 5/1208; B60K 5/1225; B60K 5/125; B60K 5/1266; B60N 2/522; B60N 2/502; B60N 2/505; B60N 2/544; F16F 15/02; F16F 15/08
See application file for complete search history.

(56) References Cited

U.S. PATENT DOCUMENTS

| | | | | |
|---|---|---|---|---|
| 3,353,771 A * | 11/1967 | Te Bow | ................ | B60K 5/125 180/292 |
| 4,518,058 A * | 5/1985 | Fister | .................... | B60K 5/125 180/297 |
| 4,595,167 A * | 6/1986 | Tangorra | ................ | B60K 5/125 248/565 |
| 4,877,225 A * | 10/1989 | Noguchi | ............... | F16F 13/262 267/140.14 |
| 5,174,552 A * | 12/1992 | Hodgson | ................ | B64D 27/26 180/300 |
| 5,388,812 A * | 2/1995 | Kojima | .................... | F16F 13/18 267/140.13 |
| 5,407,169 A * | 4/1995 | Tournier | ................. | F16F 13/26 248/562 |
| 5,582,385 A * | 12/1996 | Boyle | .................. | B60G 17/018 188/266.1 |
| 5,918,833 A * | 7/1999 | Najand | ................ | B60K 5/1208 244/54 |

(Continued)

FOREIGN PATENT DOCUMENTS

KR   10-2014-0038327 A   3/2014

*Primary Examiner* — Jacob B Meyer
(74) *Attorney, Agent, or Firm* — Morgan, Lewis & Bockius LLP

(57) ABSTRACT

An engine mount for a vehicle, in which of the inside of the engine mount is divided into an upper chamber and a lower chamber by an orifice plate, and an encapsulated hydraulic liquid flows through a center hole provided at the center of the orifice plate in accordance with a change in volume of the upper chamber, is provided. The engine mount is configured to include: a coil which is mounted in the orifice plate and forms a magnetic field in the center hole as electric current is applied; and a drive device which is formed to have a diameter corresponding to a diameter of the center hole, is configured to be inserted and disposed into the center hole, and selectively closes the center hole by moving upwards or downwards in the center hole by the formed magnetic field.

4 Claims, 5 Drawing Sheets

(56) References Cited

U.S. PATENT DOCUMENTS

| | | | | |
|---|---|---|---|---|
| 5,927,699 | A * | 7/1999 | Nakajima | H02M 3/33576 267/140.13 |
| 5,947,457 | A * | 9/1999 | Swanson | F16F 7/10 244/54 |
| 5,957,440 | A * | 9/1999 | Jones | F16F 7/1005 244/54 |
| 6,189,873 | B1 * | 2/2001 | Aoki | F16F 13/264 267/140.14 |
| 6,315,277 | B1 * | 11/2001 | Nagasawa | F16F 13/264 267/140.14 |
| 6,364,295 | B1 * | 4/2002 | Wolf | F16F 13/10 267/140.14 |
| 7,165,761 | B2 * | 1/2007 | Muraoka | F16F 13/264 267/140.14 |
| 7,188,830 | B2 * | 3/2007 | Kato | F16F 13/106 267/140.14 |
| 8,989,962 | B2 * | 3/2015 | Kim | B60R 16/037 701/36 |
| 9,016,674 | B2 * | 4/2015 | Kim | F16F 13/26 267/140.14 |
| 9,022,368 | B2 * | 5/2015 | Marienfeld | F16F 13/266 267/140.14 |
| 9,440,524 | B2 * | 9/2016 | Farjoud | F16F 13/264 |
| 9,709,123 | B2 * | 7/2017 | Kim | F16F 13/266 |
| 2002/0130003 | A1 * | 9/2002 | Lisenker | F16F 9/535 188/267.2 |
| 2004/0262831 | A1 * | 12/2004 | Maeno | B60K 5/1208 267/140.13 |
| 2005/0017420 | A1 * | 1/2005 | Nemoto | B60K 5/1208 267/140.14 |
| 2005/0051936 | A1 * | 3/2005 | Gries | F16F 13/26 267/140.14 |
| 2006/0108726 | A1 * | 5/2006 | Maeno | B60K 5/1291 267/140.13 |
| 2008/0174058 | A1 * | 7/2008 | Saiki | F16F 13/266 267/140.14 |
| 2009/0008195 | A1 * | 1/2009 | Ueki | F16F 13/105 188/282.6 |
| 2009/0241890 | A1 * | 10/2009 | Wakamatsu | F16F 9/504 123/192.1 |
| 2009/0256294 | A1 * | 10/2009 | Lee | F16F 13/105 267/140.14 |
| 2009/0295050 | A1 * | 12/2009 | Lee | F16F 13/105 267/140.14 |
| 2010/0096789 | A1 * | 4/2010 | Gannon | B60K 5/1266 267/140.15 |
| 2012/0109456 | A1 * | 5/2012 | Okamoto | F16F 13/264 701/36 |
| 2012/0242021 | A1 * | 9/2012 | Koyama | F16F 13/103 267/140.14 |
| 2013/0001843 | A1 * | 1/2013 | Kanaya | F16F 13/26 267/140.14 |
| 2013/0112839 | A1 * | 5/2013 | Kato | F16F 13/101 248/562 |
| 2013/0256960 | A1 * | 10/2013 | Marienfeld | F16F 13/264 267/140.14 |
| 2014/0110558 | A1 * | 4/2014 | Kim | F16F 13/268 248/638 |
| 2015/0034797 | A1 * | 2/2015 | Lee | F16F 13/264 248/562 |
| 2016/0001648 | A1 * | 1/2016 | Kim | B60K 5/1283 248/566 |
| 2016/0108988 | A1 * | 4/2016 | Kim | B60K 5/1208 267/140.11 |
| 2016/0123426 | A1 * | 5/2016 | Kim | F16F 13/264 267/140.14 |
| 2016/0138671 | A1 * | 5/2016 | Kim | F16F 13/22 267/140.14 |
| 2016/0186830 | A1 * | 6/2016 | Furusawa | F16F 13/105 267/140.13 |
| 2016/0223048 | A1 * | 8/2016 | Kojima | F16F 13/18 |
| 2016/0327116 | A1 * | 11/2016 | Kim | F16F 13/266 |
| 2017/0058989 | A1 * | 3/2017 | Koyama | H02K 41/031 |
| 2017/0122399 | A1 * | 5/2017 | Kim | F16F 13/107 |
| 2017/0130800 | A1 * | 5/2017 | Genderjahn | F16F 13/262 |
| 2017/0138434 | A1 * | 5/2017 | Gaither | F16F 13/002 |
| 2017/0146089 | A1 * | 5/2017 | Genderjahn | F16F 13/264 |
| 2017/0152909 | A1 * | 6/2017 | Yoshii | B60K 5/1208 |
| 2017/0152911 | A1 * | 6/2017 | Kim | F16F 13/107 |
| 2017/0204935 | A1 * | 7/2017 | Yasuda | F16F 13/26 |
| 2017/0267090 | A1 * | 9/2017 | Kim | B60K 5/1208 |
| 2017/0276208 | A1 * | 9/2017 | Kim | B60K 5/1283 |
| 2017/0292582 | A1 * | 10/2017 | Park | B60K 5/1283 |
| 2017/0313171 | A1 * | 11/2017 | Yoon | B60K 5/1208 |

\* cited by examiner

ENGINE MOUNT FOR VEHICLE

CROSS-REFERENCE TO RELATED APPLICATIONS

The present application claims priority to Korean Patent Application No. 10-2016-0164919 filed on Dec. 6, 2016, the entire contents of which are incorporated herein for all purposes by this reference.

BACKGROUND OF THE INVENTION

Field of the Invention

The present invention relates to an engine mount for a vehicle. More particularly, the invention relates to an engine mount for a vehicle, in which a structure of a drive device is changed and the size of a permanent magnet is decreased, thereby minimizing costs and weight.

Background of Related Art

In general, an engine for a vehicle is disposed in the engine compartment of a vehicle body by means of an engine mount. The engine mount is configured to insulate and attenuate the vibrations of the engine, and a rubber (engine) mount which has no encapsulated fluid and insulates and attenuates vibration using elastic force of rubber, and a fluid encapsulated engine mount (hydraulic engine mount) which is configured to have a predetermined amount of encapsulated hydraulic liquid, are widely used for a passenger vehicle.

Among the mounts, the fluid encapsulated engine mount has a structure in which a predetermined amount of hydraulic liquid is encapsulated therein and vibrations are attenuated by the flow of the hydraulic liquid. The hydraulic engine mount also has the effect of simultaneously attenuating vibrations in the high frequency region and low frequency region, wherein the range of the application of the hydraulic engine mount is increased.

Meanwhile, the fluid encapsulated engine mount has a structure in which an insulator made of an elastic material is coupled at an upper side of the housing, and a diaphragm is coupled at the lower end of the housing with an orifice plate is disposed between the insulator and the diaphragm. The orifice plate creates an internal compartment in the housing which is divided into an upper liquid chamber and a lower liquid chamber.

Typically, the orifice plate has the structure in which two or more plates are coupled, and two flow paths (annular flow paths) are circumferentially formed to correspond to low-speed and high-speed driving frequencies, wherein the encapsulated hydraulic liquid may flow between the upper liquid chamber and the lower liquid chamber.

Here, according to an operational principle of the fluid encapsulated engine mount, the fluid encapsulated engine mount attenuates vibrations by changing the polarity of an electromagnet based on information about the vibration of the engine, the gear state of the transmission, and the rotation frequencies of the engine from an accelerometer, a CPU, and an ECU, and electromagnets are provided in pairs, and a distance between the electromagnets is maintained constant.

In the case of the fluid encapsulated engine mount, it is important to improve the insulation performance when the engine idles as well as ride quality performance by increasing a loss factor when the vehicle travels, but there is the problem in that a decrease in dynamic characteristics causes a decrease in loss factor, and an increase in loss factor causes an increase in dynamic characteristics, wherein the dynamic characteristics and the loss factor conflict with each other.

To the present end an active engine mount may be adopted which is configured to be supplied with electric power in accordance with a predetermined algorithm based on information about the engine state, the driving state of the vehicle, and an acceleration signal and may alter the characteristics of the engine mount depending on the driving situation, but the active engine mount has a complicated structure. The complex structure has an increased weight, volume, and cost than the fluid encapsulated engine mount, and as a result the active engine mount may be difficult to dispose in a compatible manner.

The information disclosed in this Background of the Invention section is only for enhancement of understanding of the background of the invention and should not be taken as an acknowledgement or any form of suggestion that this information forms the related art already known to a person skilled in the art.

BRIEF SUMMARY

Various aspects of the present invention are directed to providing an engine mount for a vehicle in which a drive device, which has a size corresponding to the size of a flow path through which a liquid passes, is connected with a permanent magnet and fixed in the flow path, and a stopper is disposed on the drive device to prevent the drive device from being withdrawn from the flow path when the drive device moves, and as a result, it is possible to omit a separate member for connection with a diaphragm, preventing an increase in weight, and it is possible to reduce a size of the permanent magnet because of a structure of the drive device, minimizing an increase in costs.

An aspect of the present invention is directed to provide an engine mount for a vehicle, in which the inside of the engine mount is divided into an upper chamber and a lower chamber by an orifice plate, and an encapsulated hydraulic liquid flows through a center hole disposed at the center of the orifice plate in accordance with a change in volume of the upper chamber. The engine mount including a coil which is mounted inside the orifice plate and forms a magnetic field in the center hole when electric current is applied; and a drive device which is formed to have a diameter corresponding to the diameter of the center hole, and is inserted and disposed into the center hole and selectively closes the center hole by moving upwards and downwards in the center hole by the formed magnetic field.

In an exemplary embodiment, the drive device may include a pipe inserted into the center hole; and a shield member which has a diameter greater than the diameter of the center hole, is coupled to a fastening member disposed on an upper portion of the pipe. The fastening member is disposed with a permanent magnet therein, and moved together with the pipe by the magnetic force created when an electric current is applied, to open an inlet of the center hole.

In another exemplary embodiment, the permanent magnet may be disposed in the shield member. The permanent magnet is disposed in a direction to ensure the permanent magnet has the same polarity as the magnetic field formed in the center hole.

In still another exemplary embodiment, the pipe may be formed to have a height greater than the height of the center hole, and may have a plurality of inflow holes formed along the external circumferential surface of the upper portion of the pipe. The inflow holes are exposed to the upper chamber so that the hydraulic liquid flows into the center hole when electric current is applied.

In yet another exemplary embodiment, the drive device may further include a stopper which has a diameter greater than the diameter of the center hole and disposed on the lower portion of the pipe. The stopper is caught by the outlet of the center hole when the pipe is moved and an elastic pad disposed on an upper portion of the stopper facing the center hole, configured to reduce the impact that occurs when the stopper is caught by the center hole.

According to an exemplary embodiment of the present invention, the drive device, whose size corresponds to the size oft flow path through which the liquid passes, is connected with the permanent magnet and fixed in the flow path. The stopper is disposed on the drive device to prevent the drive device from being withdrawn from the flow path when the drive device moves. As a result, the drive device may omit a separate member for connection with the diaphragm, preventing an increase in weight, reducing the size of the permanent magnet due to the structure of the drive device, and minimizing an increase in costs.

Other aspects and exemplary embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuel derived from resources other than petroleum). As referred to herein, a hybrid vehicle is a vehicle that has two or more sources of power, for example both gasoline-powered and electric-powered vehicles.

The above and other features of the invention are discussed infra.

The methods and apparatuses of the present invention have other features and advantages which will be apparent from or are set forth in more detail in the accompanying drawings, which are incorporated herein, and the following Detailed Description, which together server to explain certain principles of the present invention.

Figure 1:
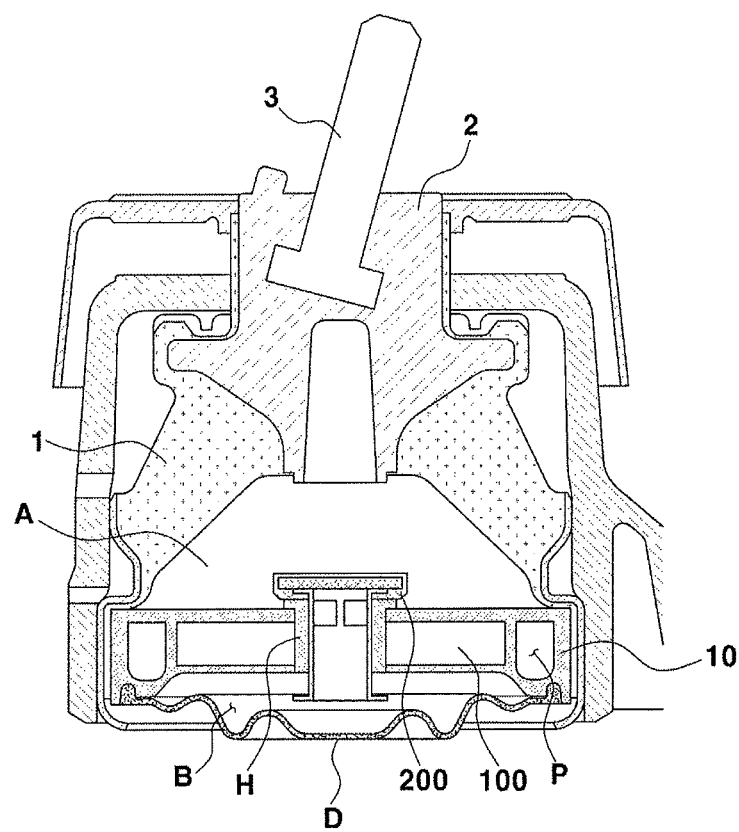
FIG. 1 is a view illustrating an engine mount for a vehicle according to an exemplary embodiment of the present invention when a vehicle travels.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

In the description of the present invention, a detailed explanation of publicly known related technologies may be omitted to avoid unnecessarily obscuring the subject matter of the present invention.

Figure 2:
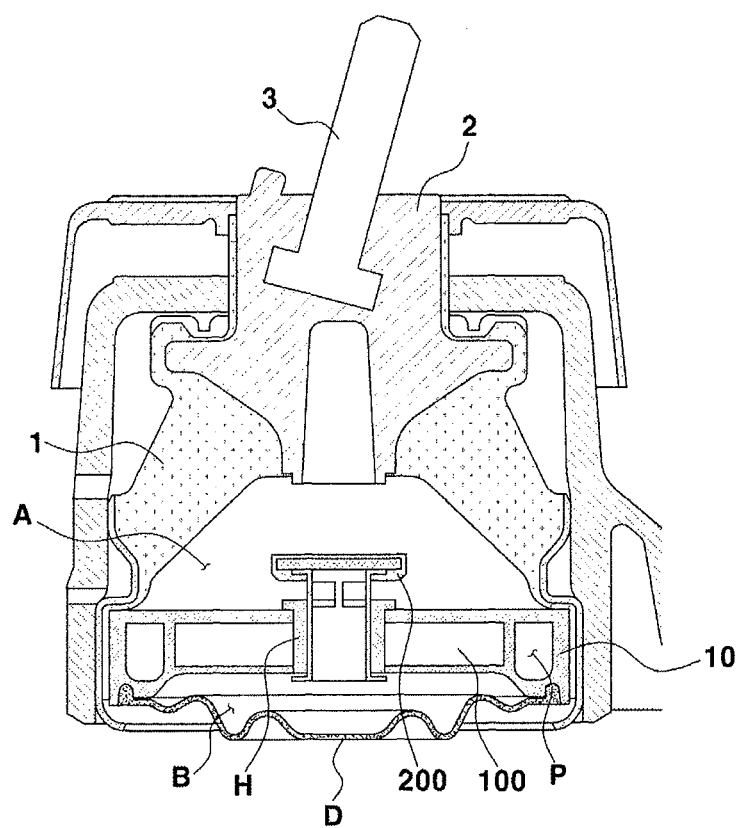
FIG. 2 is a view illustrating the engine mount for a vehicle according to the exemplary embodiment of the present invention when an engine idles.
Figure 3:
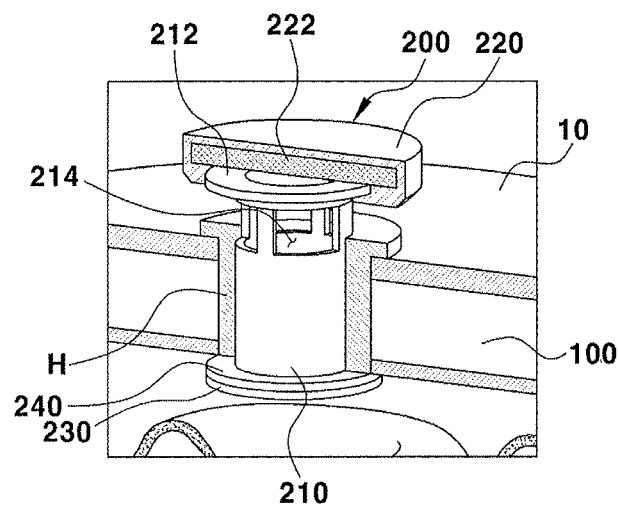
FIG. 3 is a view illustrating a structure of a drive device for the engine mount for a vehicle according to the exemplary embodiment of the present invention when the engine idles.
Figure 4:
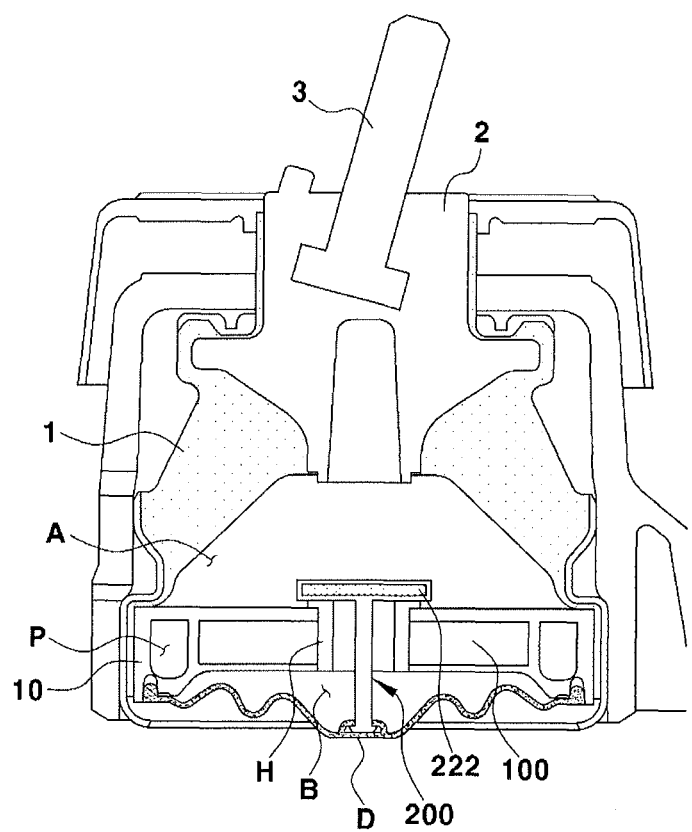
FIG. 4 is a view illustrating an engine mount for a vehicle in the related art when a vehicle travels.
Figure 5:
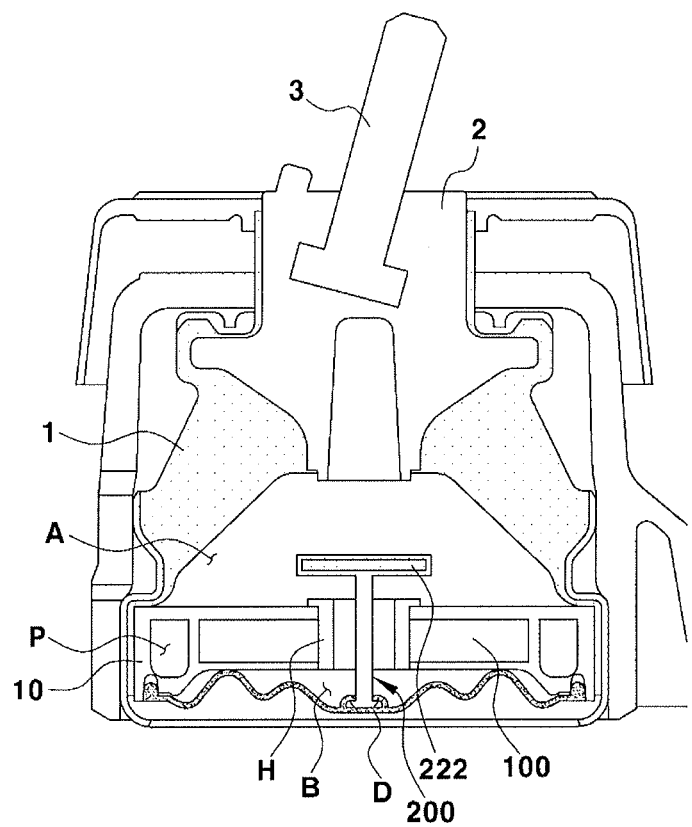
FIG. 5 is a view illustrating the engine mount for a vehicle in the related art when an engine idles.

FIG. 1 is a view illustrating an engine mount for a vehicle according to an exemplary embodiment of the present invention when a vehicle travels. FIG. 2 is a view illustrating the engine mount for a vehicle according to an exemplary embodiment of the present invention when an engine idles. FIG. 3 is a view illustrating the structure of a drive device for the engine mount for a vehicle according to an exemplary embodiment of the present invention when the engine idles, FIG. 4 is a view illustrating an engine mount for a vehicle in the related art when a vehicle travels, and FIG. 5 is a view illustrating the engine mount for a vehicle in the related art when an engine idles.

In general, a diaphragm D is coupled at a lower end portion of an engine mount for a vehicle, and an insulator 1 is coupled at an upper side of a housing configured in a cup shape.

The insulator 1 includes a synthetic resin or synthetic rubber material, has a predetermined elasticity, and is coupled to the engine by the metallic core 2 and the metallic center bolt 3, supporting a load.

A predetermined volume of hydraulic liquid is encapsulated in the internal compartment formed between the insulator 1 and the diaphragm D, and characterized by the orifice plate 10, the upper chamber A formed at an upper side, and the lower chamber B formed at a lower side.

Here, the orifice plate 10 has a structure in which a center hole H allows the upper chamber A and the lower chamber B to communicate with each other, and is formed therein. When the insulator 1 is elastically deformed by a load and a vibration is transmitted from the engine the internal volume is changed forcing the hydraulic liquid to flow between the upper chamber A and the lower chamber B through center hole H.

In the orifice plate 10, the center hole H, through which the hydraulic liquid passes when the engine of the vehicle idles, includes steel, and a flow path P, through which the hydraulic liquid passes when the vehicle travels, includes aluminum or plastic. Further, a coil 100 is wound inside the orifice plate 10 so that a magnetic field may be formed in the center hole H when an electric current is applied.

That is, as illustrated in FIG. 2, the coil 100 is mounted in the orifice plate 10 wherein a magnetic field is formed in the center hole H as electric current is applied to the coil 100 when the engine of the vehicle idles, and a magnetic north pole is formed at an upper side of the center hole H, and a magnetic south pole is formed at a lower side of the center hole H.

Here, a drive device 200 is disposed in the center hole H configured to selectively open or close the center hole H when the magnetic field is formed. Therefore, when the vehicle travels the drive device 200 closes the center hole H to allow the hydraulic liquid to flow through the flow path P, increasing a loss factor. When the engine idles the drive device 200 allows the hydraulic liquid to flow along the center hole H from the upper chamber A to the lower chamber B, decreasing the dynamic characteristics.

In other words, the drive device 200 has a diameter corresponding to the diameter of the center hole H, and is inserted and disposed into the center hole H. The drive device 200 is moved upwards and downwards in the center hole H by magnetic force when a magnetic field is generated by the applied electric current, selectively closing the center hole H.

Since the drive device 200 has a diameter corresponding to the diameter of the center hole H as described above, it is possible to prevent without a separate fixing member the position of the drive device 200 from being changed in the center hole H when opening the center hole H.

To this end portion, the drive device 200 is provided with a pipe 210 and a shield member 220.

The pipe 210 has a predetermined length and is inserted into the center hole H. The diameter of the pipe 210 corresponds to the diameter of the center hole H.

The pipe 210 has a length longer than the length of the center hole H, and has a plurality of inflow holes 214 which are formed along an external circumferential surface of an upper portion of the pipe 210 exposed to the upper chamber A so that the hydraulic liquid may flow into the center hole H when the pipe is moved upwards to open the center hole H as an electric current is applied.

In more detail, as illustrated in FIG. 2, a magnetic field is formed in the center hole H as electric current is applied to the coil 100 to open the center hole H when the engine of the vehicle idles, and in the present case, it is difficult for the hydraulic liquid to flow into the center hole H because the pipe 210 has a diameter corresponding to the diameter of the center hole H.

Therefore, in the present exemplary embodiment, as illustrated in FIG. 3, the plurality of inflow holes 214 are formed in the external circumferential surface of the upper portion of the pipe 210, and as a result, with the diameter of the pipe 210, the position of the pipe 210 may be fixed when the engine of the vehicle idles, and the hydraulic liquid may easily flow into the lower chamber B along the center hole H.

The shield member 220 has a diameter greater than the diameter of the center hole H, and is coupled to a fastening member 212 provided on the upper portion of the pipe 210, and a permanent magnet 222 having a predetermined size is disposed in the shield member 220, wherein when electric current is applied, the shield member 220 is moved by magnetic force, together with the pipe 210, toward the upper chamber A to open an inlet of the center hole H.

Here, the permanent magnet 222 is disposed in the shield member 220 in a direction in which the permanent magnet 222 has the same polarity as the magnetic field formed in the center hole H, that is, in a direction in which a region for forming a magnetic north pole is positioned at a upper side and a region for forming magnetic south pole is positioned in a lower side, so that the pipe 210 and the shield member 220 may be moved by the magnetic field generated when an electric current is applied.

Therefore, since the permanent magnet 222 has the same polarity as the magnetic field formed in the center hole H when electric current is applied to the coil 100 as the engine of the vehicle idles, the shield member 220 may be moved by magnetism to open the center hole H.

The drive device 200 may further include a stopper 230 and an elastic pad 240.

The stopper 230 has a diameter greater than the diameter of the center hole H, and is formed on a lower portion of the pipe 210. The stopper 230 is caught by an outlet of the center hole H when the pipe 210 is moved by the formed magnetic field, guiding the movement route of the pipe 210.

The elastic pad 240 is formed on the upper portion of the stopper 230 which faces the center hole H, and is configured to reduce the impact that occurs when the stopper 230 is caught by the center hole H when the pipe 210 moves as described above.

Therefore, in the present exemplary embodiment, the stopper 230 and the elastic pad 240 are disposed in the drive device 200 to be able to effectively guide the movement route of the pipe 210 to open the center hole H when the engine of the vehicle idles. As a result, to the drive device 200 may omit a separate member for connection with the diaphragm D, unlike the engine mount in the related art as illustrated in FIG. 4 and FIG. 5, preventing an increase in weight and costs.

Meanwhile, when the vehicle travels the electric current being applied to the coil 100 is cut off wherein the magnetic field is zero in the center hole H, and thus the hydraulic liquid flows through the flow path P. Yet in the case of the engine mount in the related art the position of the shield member 220 is fixed by a structure in which the diaphragm D and the pipe 210 are connected as illustrated in FIG. 4.

However, as illustrated in FIG. 5, when the engine of the vehicle idles the center hole H is opened by the permanent magnet 222 disposed in the shield member 220 being repelled by the magnetic field formed in the center hole H as electric current is applied to the coil 100. In the present case, since the diameter of the pipe 210 is significantly smaller than an internal diameter of the center hole H it is difficult to fix the position of the shield member 220 in the state in which the center hole H is opened.

Since it may be difficult to effectively fix and open the center hole H due to the diameter of the pipe 210 as described above, it is necessary to allow the permanent magnet 222 to have a relatively large size to easily move the shield member 220, but in the case, because the permanent magnet 222 is expensive costs may increase.

To this end portion, in an exemplary embodiment, the pipe 210, which has a diameter corresponding to the diameter of the center hole H through which the hydraulic liquid flows, is provided and the shield member 220 having the permanent magnet 222 is connected to the upper portion of the pipe 210, and fixed to the center hole H. As a result, it is possible to fix the position of pipe 210 when the center hole H is opened as the engine of the vehicle idles, reducing the size of permanent magnet 222 and minimizing an increase in costs.

According to an exemplary embodiment of the present invention, the drive device, which has a size corresponding to the size of a flow path through which a liquid passes, is connected with the permanent magnet and fixed in the flow path. A stopper is disposed on the drive device to prevent the driver device from being withdrawn from the flow path when the drive device moves. As a result, the drive device may omit a separate member for connection with the diaphragm, preventing an increase in weight, reducing the size of the permanent magnet because of a structure of the drive device, and minimizing an increase in costs.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards" and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An engine mount for a vehicle, in which the inside of the engine mount is divided into an upper chamber and a lower chamber by an orifice plate, and an encapsulated hydraulic liquid flows through a center hole provided at the center of the orifice plate in accordance with a change in volume of the upper chamber, the engine mount comprising:
    a coil which is mounted in the orifice plate, and forms a magnetic field in the center hole as electric current is applied; and
    a drive device which selectively closes the center hole by moving upwards or downwards in the center hole by the formed magnetic field, wherein the drive device comprises: a pipe which is formed to have a diameter corresponding to a diameter of the center hole and a length, and is configured to flow the hydraulic liquid therethrough when inserted and disposed into the center hole; and
    a shield member which has a diameter greater than a diameter of the center hole, is coupled to a fastening member provided on an upper portion of the pipe, is provided with a permanent magnet therein, and is configured to be moved, together with the pipe, by magnetic force when the electric current is applied to open an inlet of the center hole.

2. The engine mount of claim 1, wherein the permanent magnet is provided in the shield member in a direction in which the permanent magnet has a same polarity as the magnetic field formed in the center hole.

3. The engine mount of claim 1, wherein the pipe is formed to have a height greater than a height of the center hole, and has a plurality of inflow holes which are formed along an external circumferential surface of the upper portion of the pipe exposed to the upper chamber, and wherein the hydraulic liquid flows into the center hole when the electric current is applied.

4. The engine mount of claim 1, wherein the drive device further includes:
    a stopper which has a diameter greater than a diameter of the center hole, is disposed on a lower portion of the pipe, and is caught by an outlet of the center hole when the pipe is configured to be moved; and
    an elastic pad which is disposed on an upper portion of the stopper that faces the center hole, and reduces impact that occurs when the stopper is caught by the center hole.

* * * * *